United States Patent
Akamatsu

[11] Patent Number: 5,259,039
[45] Date of Patent: Nov. 2, 1993

[54] METHOD OF SEPARATING SPECIFIC PATTERNS FROM PATTERN SPACE AND APPARATUS THEREFOR

[75] Inventor: Norio Akamatsu, Tokushima, Japan

[73] Assignee: Justsystem Corporation, Tokushima, Japan

[21] Appl. No.: 947,398

[22] Filed: Sep. 21, 1992

[30] Foreign Application Priority Data

Sep. 26, 1991 [JP] Japan .................... 3-277110

[51] Int. Cl.$^5$ ............................................. G06K 9/00
[52] U.S. Cl. ............................................. 382/14; 395/21
[58] Field of Search ................... 382/14, 15; 395/21, 395/23, 24, 26

[56] References Cited

U.S. PATENT DOCUMENTS

| | | | |
|---|---|---|---|
| 5,003,490 | 3/1991 | Castelaz et al. ............... | 382/15 |
| 5,048,100 | 9/1991 | Kuperstein ..................... | 382/15 |
| 5,056,147 | 10/1991 | Turner et al. ................... | 382/14 |

Primary Examiner—Leo H. Boudreau
Attorney, Agent, or Firm—Sandler, Greenblum & Bernstein

[57] ABSTRACT

There is provided a pattern separation apparatus capable of separating patterns of a specific group from a plurality of patterns constituting a plurality of groups present in an n-dimensional pattern space in accordance with simple computational processing, the apparatus being used in a variety of applications such as recognition of characters, figures, and the like. An average of a set of ● patterns is calculated to be $X_{av}$, and a vector closest to $X_{av}$ is defined as a key point and represented by $X_{key}$, $X_{key}$ s chosen as the most central point. An n-dimensional space having $X_{key}$ as its center is assumed to calculate a main plane in which the number of ● patterns is larger than that of ○ patterns. When other ○ patterns are included in the main plane, a subplane is calculated to eliminate these patterns from the main plane. When other ● patterns are included in planes other than the main plane, a subplane for separating these ● patterns from the ○ patterns and enclosing the ● patterns is calculated. The specific patterns ● are separated by the main plane and the subplanes.

4 Claims, 6 Drawing Sheets

INPUT LAYER
(L NEURON ELEMENTS)

INTERMEDIATE LAYER
(M NEURON ELEMENTS)

OUTPUT LAYER
(N NEURON ELEMENTS)

● LEARNING PATTERN (OUTPUT '1')
○ LEARNING PATTERN (OUTPUT '0')
  N-DIMENSIONAL PATTERN SPACE

SEPARATION BY PLANES
THREE-DIMENSIONAL SEPARATION FOR K=1

(0.0.0.0) → 1   (0.1.0.0) → 1   (1.0.0.0) → 1   (1.1.0.0) → 0
(0.0.0.1) → 1   (0.1.0.1) → 0   (1.0.0.1) → 0   (1.1.0.1) → 0
(0.0.1.0) → 0   (0.1.1.0) → 0   (1.0.1.0) → 0   (1.1.1.0) → 0
(0.0.1.1) → 0   (0.1.1.1) → 1   (1.0.1.1) → 1   (1.1.1.1) → 0

FOUR-DIMENSIONAL PATTERN SPACE

FORMED NETWORK

RECOGNITION RATE BY NOISE

METHOD OF SEPARATING SPECIFIC PATTERNS FROM PATTERN SPACE AND APPARATUS THEREFOR

BACKGROUND OF THE INVENTION

1. Field of the Invention

The present invention relates to a method of separating specific patterns from a pattern space and an apparatus therefor and, more particularly, to a separation method and apparatus for determining each coupling weight combining neural elements in a hierarchical neural network in accordance with a learning pattern.

2. Description of the Related Art

For example, assuming an n-dimensional pattern space, to recognize a character or image, patterns belonging to a specific group are often separated from a plurality of patterns classified into a plurality of groups in the pattern space.

In separation of specific patterns to recognize characters or the like, a neural network has received a great deal of attention for technologically realizing the mechanism of a human cranial nerve system, thereby performing data processing. A neural network is constituted by a plurality of neuron elements, and predetermined learning allows efficient pattern recognition of characters, figures, and the like, efficient speech analysis and synthesis, efficient continuous analog data processing, and efficient parallel processing of a large number of data.

The neural network is constituted by a neuron element network having a plurality of neuron elements for propagating data and a learning controller for controlling learning in the neuron element network. This neuron element network comprises an input layer for receiving data, an output layer for outputting data in response to the input data, and at least one intermediate layer located between the input and output layers. The neuron elements arranged between the respective layers in the neuron element network are coupled to each other with predetermined strengths (coupling weights). Output signals are changed in accordance with differences in the coupling weights.

In a conventional neural network having a hierarchical structure as described above, the coupling weights between the neuron elements are changed, thereby executing "learning" processing.

Learning is performed by analog or binary data (patterns) supplied in correspondence with the number of inputs and outputs of the input and output layers. Assume that input data is supplied as a learning pattern from the input layer and an output signal is obtained from the output layer in response to this input learning pattern. The correct solution to this output signal is generally called a teacher signal. A plurality of learning patterns are processed for correcting the coupling weights of the respective neuron elements to minimize differences between the output signals and the teacher signals, thereby performing learning.

A practical conventional method of correcting coupling weights between the respective neuron elements in a neuron element network to cause an output signal to coincide with a teacher signal is a back-propagation algorithm (to be referred to as a BP algorithm thereinafter).

According to the BP algorithm, the coupling weights between neuron elements of all layers constituting the neural network are corrected to minimize square errors between teacher signals and output values from the output layer. More specifically, errors in the output layer are judged as a cumulative value of errors occurring in the neuron elements of each intermediate layer. The coupling weights are corrected to minimize not only errors from the output layer but also errors in the neuron elements of each intermediate layer. Therefore, all the errors in the neuron elements of the output layer and each intermediate layer are calculated by computational processing.

In this computational processing, an error value of each neuron element of the output layer is given as an initial value, and backward calculations are performed such that an error value of each neuron element of the nth intermediate layer, an error value of each neuron element of the $(n-1)$th intermediate layer . . . , are sequentially calculated. Correction values for the coupling weights are then calculated using the error values of the respective neuron elements and the corresponding coupling weights.

Learning processing of all learning patterns is repeated by a predetermined number of times or until an error between each teacher signal and the corresponding output signal becomes below a predetermined value, thereby completing learning.

Learning in a hierarchical neural network by the conventional BP algorithm, however, requires complicated computational error processing for calculating correction values. Therefore, the BP algorithm is undesirably time-consuming until learning is completed.

In addition, the BP algorithm may result in local minima trapping.

SUMMARY OF THE INVENTION

It is, therefore, an object of the present invention to provide a separation method and apparatus capable of separating patterns of a specific group from a plurality of patterns constituting a plurality of groups present in an n-dimensional pattern space in accordance with a simple computational processing, thereby separating the specific patterns from the pattern area. This can be applied to recognition of, e.g., characters and images.

According to claim 1 of the present invention, a specific pattern is separated from an assumed n-dimensional pattern space by the first step of calculating a main plane having a larger number of patterns of a specific group than other patterns among a plurality of patterns constituting a plurality of groups present in the n-dimensional pattern space, the second step of calculating a subplane for eliminating other patterns from the main plane when the other patterns are included in the main plane that was obtained the first step, the third step of repetively calculating subplanes for separating patterns of the specific group from other patterns and enclosing the patterns of the specific group when the patterns of the specific group are included in a plane other than the main plane calculated in the first step, and the fourth step of separating the specific patterns by the main plane and the subplanes which are respectively calculated in the first, second, and third steps.

According to claim 2 of the present invention, an apparatus for separating specific patterns from an assumed n-dimensional pattern space, comprises first calculating means for calculating a main plane having a larger number of patterns of a specific group than other patterns among a plurality of patterns constituting a plurality of groups present in the n-dimensional pattern space, second calculating means for calculating a subplane for eliminating other patterns from the main plane when the other patterns are included in the main plane calculated by the first calculating means, third calculating means for calculating a subplane for separating patterns of the specific group from other patterns and enclosing the patterns of the specific group when the patterns of the specific group are included in a plane other than the main plane calculated by the first calculating means, and means for separating the specific patterns by the main plane and the subplanes which are respectively calculated by the first, second, and third calculating means.

DETAILED DESCRIPTION OF THE PREFERRED EMBODIMENT

An embodiment for determining coupling weights in a neural network by a method and apparatus for separating specific patterns from a pattern space according to the present invention will be described with reference to the accompanying drawings.

Figure 1:
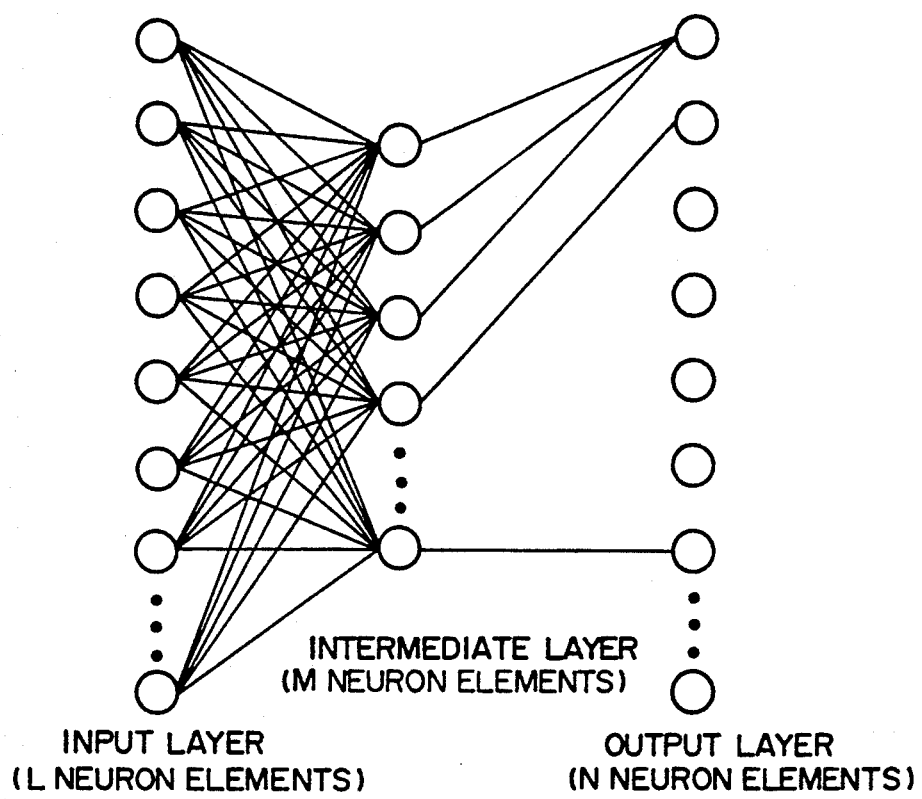
FIG. 1 is a diagram of a neural network, coupling weights of which are determined by an apparatus for separating specific patterns according to an embodiment of the present invention.

FIG. 1 shows a system configuration of a neural network, coupling weights of which are determined by the apparatus for separating the specific patterns of this embodiment. In this neural network, an input layer comprises L neuron elements, an intermediate layer comprises M neuron elements, and an output layer comprises N neuron elements.

Although partially omitted in FIG. 1, each neuron element of the intermediate layer (intermediate neuron element) is coupled to all neuron elements of the input layer (L input neuron elements). Each neuron element of the output layer (output neuron element) is similarly connected to all of the M intermediate neuron elements. The intermediate neuron elements are selected and used in correspondence with a main plane and subplanes which are calculated in a manner to be described later. Each output neuron element is coupled to a specific intermediate neuron element with a coupling weight of "1" and is coupled to other intermediate neuron elements with a coupling weight of "0", i.e., is set in an uncoupled state with other intermediate neuron elements.

Each neuron element is constituted by neural hardware but may be constituted by Neumann computer software.

Figure 2:
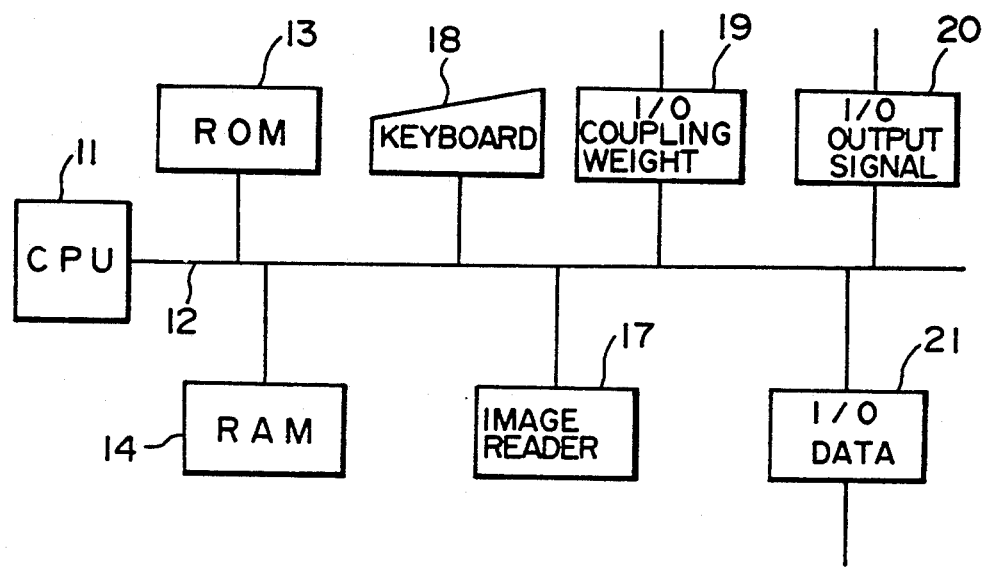
FIG. 2 is a block diagram of an apparatus for separating specific patterns to determine the coupling weights in the neural network in FIG. 1.

FIG. 2 is a block diagram showing an arrangement of an apparatus for separating specific patterns to determine the respective coupling weights in this neural network.

This apparatus comprises a CPU (Central Processing Unit) 11 for performing various control operations such as an operation for mapping each learning data of a neural network on an n-dimensional pattern space, separating specific learning patterns from the pattern space by a main plane and subplanes, and calculating coupling weights between the neuron elements. This CPU 11 is connected to the following components through a bus line 12 such as a data bus.

More specifically, the bus line 12 is connected to a ROM (Read-Only Memory) 13 for storing various programs for causing the CPU 11 to perform operations such as an operation for determining coupling weights between the respective neuron elements in the neural network.

The bus line 12 is also connected to a RAM (Random Access Memory) 14 for storing learning patterns and other various data, an image reader 17 for reading characters and figures as input data to be recognized, a keyboard 18 serving as an input device for designating start and end of various control operations, and various I/O ports such as a coupling weight I/O (Input/Output port) 19 for supplying the determined coupling weights to the respective neuron elements in the neural network, an output signal I/O 20 for receiving a signal representing an active state of the intermediate layer and output values from the output layer, and a data I/O 21 for interfacing various data such as learning patterns.

The bus line 12 is further connected to a speech input device (not shown) for speech recognition, as needed.

A method of determining coupling weights in the apparatus having the above arrangement will now be described below. For the descriptive convenience and the facilitation of understanding, this embodiment exemplifies an algorithm for a three layered network having an input layer, an intermediate layer, and an output layer.

1. General Description of Pattern Separation Algorithm

Figure 3:
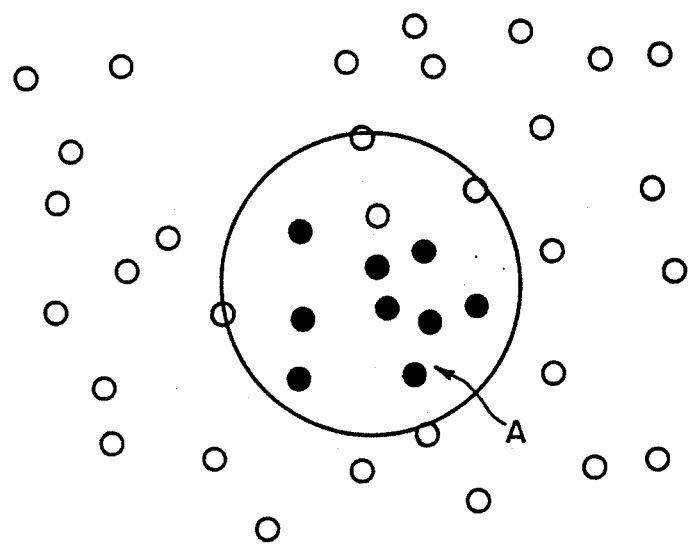
FIG. 3 is a view for explaining a pattern space for learning patterns.

Assume a pattern space (FIG. 3) for learning patterns. Referring to FIG. 3, a plurality of patterns ○ and ● presented on the pattern space 2 constitute learning patterns. Recognition of characters, figures, or the like in the neural network is separation of a given set of patterns from other sets of patterns.

This pattern separation is formation of super planes to divide the pattern space by the intermediate neuron elements when viewed from one neuron element in the output layer.

As shown in FIG. 3, in character recognition, patterns of the same type are assumed to be close to each other. This pattern separation algorithm constitutes super planes for perfectly separating the ● patterns from the patterns. For a simple problem, an appropriate plane is formed so that one separation plane can separate different patterns from each other.

For a complicated problem, however, the patterns may have different patterns in a separated area even if the pattern space is simply divided by a plane. Thus, for some sets of patterns, the pattern space cannot be satisfactorily separated into parts by one separation plane. In order to overcome this drawback, assuming a main plane and subplanes, global separation is performed using the main plane, and areas which cannot be separated by the main plane are separated by subplanes.

2. Details of Pattern Separation Algorithm (1) Definition

An average of a set of ● patterns is calculated to be $X_{av}$, and a vector closest to $X_{av}$ is defined as a key point and represented by $X_{key}$. $X_{key}$ s chosen as the most central point.

$X_{ye, dis}$ $X_{no, clo}$, and Ham[X, Y] are defined as follows:
$X_{ye, dis}$: the furthest point to $X_{key}$ among the input vectors that corresponds to a "1" as output
$X_{no, clo}$: the closest point to $X_{key}$ among the input vectors that corresponds to a "0" as output
Ham[X, Y]: the Hamming distance between vectors X and Y.

An operation for determining the respective coupling weights in accordance with the above definitions will be described below.

① Condition 1: Ham[$X_{key}$, $X_{ye, dis}$] < Ham[$X_{key}$, $X_{no, clo}$]

If this condition is satisfied, then K=Ham[$X_{key}$, $X_{no, clo}$]−1, and the procedure advances to ③.

If condition 1 is not satisfied, then K=1, and the procedure advances to ②.

② Condition 2: (the number of ● patterns < the number of ○ Patterns) or (K > Ham[$X_{key}$, $X_{ye, dis}$]) at a point of a Hamming distance K away from $X_{key}$ If the above condition is satisfied, the procedure advances to ③.

If, however, the above condition is not satisfied, then K=K+1, and the procedure advances to ②.

③ A main plane and subplanes are formed from the K value in accordance with the following steps.

First, formation of the main plane will be described.

Assume that n learning patterns are recognized into A to Z groups by the neural network.

As shown in FIG. 3, to recognize the A group, signals of "1" are output from output neuron elements corresponding to the A group (output of the output signal of "1" from a neuron element will be referred to as ON hereinafter), and other neuron elements are not ON.

When viewed from output neuron elements corresponding to the A group, these output neuron elements must be ON for A group patterns and must not be ON for patterns other than the A group patterns. For this purpose, a plane which encloses only the A group patterns is formed. One plane corresponds to one intermediate neuron element, and only the intermediate neuron elements corresponding to the enclosing planes are coupled to the output neurons corresponding to the A group. That is, the number of intermediate neuron elements is determined corresponding to the number of planes surrounding this group.

Determination of coupling weights of the input and intermediate layers will be described below.

Figure 4:
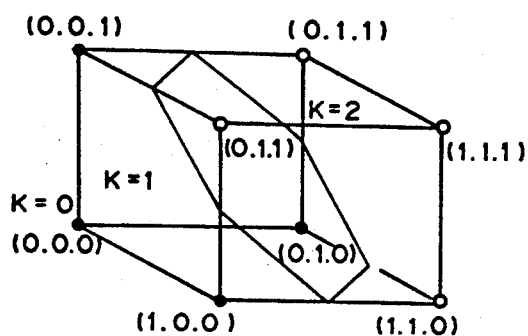
FIG. 4 is a view for explaining a state in which an area within an $X_{key}$ amming distance K for $X_{key}\{0, 0, 0, \ldots, 0\}$ and an area exceeding a Hamming distance $(K+1)$.

If $X_{key}$={0, 0, 0, . . . , 0}, then an area that is K Hamming distance away from $X_{key}$ and an area that is (K+1) Hamming distance or more therefrom are formed and separated from each other by plane equation (11) as follows (FIG. 4):

$$\sum_{k=1}^{n} X_k = \frac{\{K + (K + 1)\}}{2} \quad (11)$$

where n is an integer.

If $X_{key}$ is not at the origin, the coordinates are translated by relation (12) to translate the plane, and equation (11) is then used upon the coordinate translation:

$$X_k 43\ 1 - X_k \quad (12).$$

In equation (11), the $X_k$ coefficients serve as coupling weights of the intermediate neuron elements selected in correspondence with the planes with respect to the input neuron elements. Therefore, each coupling weight has a value of "1" or "−1". The righthand side values serve as threshold values of the intermediate neuron elements.

The "front side" and the "rear side" of the plane are defined by inequalities (13) and (14), respectively:

$$\sum_{k=1}^{n} X_k - \frac{\{K + (K + 1)\}}{2} < 0 \quad (13)$$

where n is an integer.

$$\sum_{k=1}^{n} X_k - \frac{\{K + (K + 1)\}}{2} > 0 \quad (14)$$

where n is an integer.

An area which satisfies inequality (13) is defined as the "front side" of the plane, and an area which satisfies inequality (14) is defined as the "rear side" of the plane. A characteristic function of an intermediate neuron element is set such that it is ON when it satisfies inequality (13) and is OFF when it satisfies inequality (14).

That is, a target group is surrounded or enclosed by the "front sides" of the main plane and subplanes. When a given pattern is input, an intermediate neuron element corresponding to a plane to the "front side" of which this input pattern faces is set ON.

On the other hand, the above algorithm is repeated for the points within the main plane and the ● patterns surround by the planes except for the main plane.

In other words, subplanes are formed to eliminate the ○ points from themain plane, and at the same time, to enclose the ● patterns surround by the planes except for the main plane.

Formation of subplanes continues until all the ● patterns are enclosed and all the ○ patterns are eliminated.

Determination of coupling weights of the intermediate and output layers will be described below.

Figure 5:
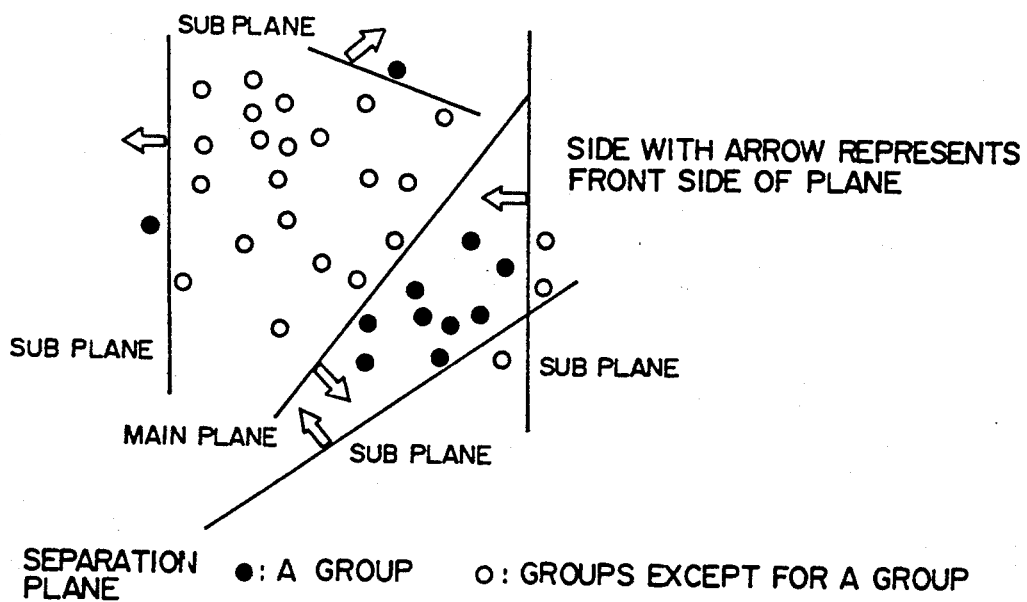
FIG. 5 is a view for explaining a state in which a specific group is enclosed by a main plane and subplanes.

FIG. 5 shows a state in which a specific group is surrounded or enclosed by a main plane and subplanes. As shown in FIG. 5, there are two methods of enclosing a group of ● patterns (to be referred to as an A group hereinafter). One method (method a) is a method of enclosing the A group by a main plane and a plurality of subplanes; and the other method (method b) is a method of enclosing the A group by one subplane. An area defined by the method a is only one, while several areas are defined by the method b.

Assume that coupling weights between intermediate neuron elements corresponding to the surrounding planes according to the method a and output neuron elements corresponding to the A group are given as "1", and their threshold value is defined as "(the number of planes that surround the area by the method a) - 0.5". If a given input pattern is a pattern included in an area defined by all the "front sides" of the planes that surround the area by the method a, the corresponding output neuron element is set ON. The output neuron elements are set ON for only patterns enclosed in the area surrounded by the method a.

On the other hand, an area surrounded by the method b is located on the rear side of the main plane and the front sides of all the subplanes formed by the method a. In an area on the rear side of the main plane, the coupling weight is deficient by 1 to set an output neuron element ON. When the coupling weights of the intermediate neuron element corresponding to the plane of the method b and the output neuron elements corresponding to the A group are therefore set to be "1, each coupling weight within the area defined by the method b exceeds the threshold value, thereby setting the output neuron element ON.

An operation for determining a coupling weight will be described in a simple example.

Figures 6, 7:
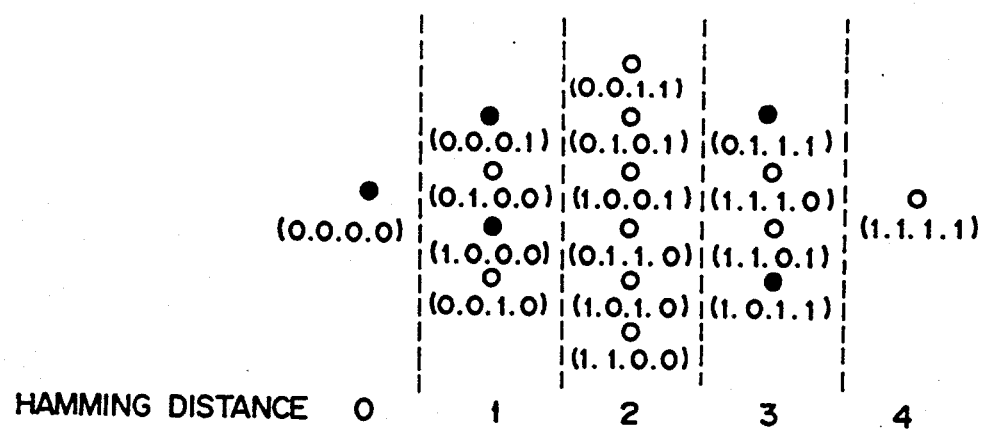
FIG. 6 is a view showing learning patterns for forming a neural network.
FIG. 7 is a view for explaining a pattern space with reference to $X_{key}$ or the learning patterns shown in FIG. 6.

Assuming that the number of input neuron elements is four, a network for separating specific patterns is created, as shown in FIG. 6. At this time, a pattern for outputting "1" is defined as $X_{key} = \{0,0,0,0\}$.

FIG. 7 shows a pattern space with reference to $X_{key}$. As can be understood from FIG. 7, a main plane is formed so that an area of a Hamming distance of "1" is separated from an area of a Hamming distance of "2". In this case, the front side of the plane faces the $X_{key}$ direction. Three subplanes are formed to separate areas of (0,0,1,0), (0,1,1,1), and (1,0,1,1). In this case, a total of four separation planes, i.e., four intermediate neuron elements are required.

If $(x_1, x_2, x_3, x_4)$ is given, then the four separation planes are defined by equations (15), (16), (17), and (18), respectively:

$$x_1 + x_2 + x_3 + x_4 = 1.5 \quad (15)$$

$$x_1 + x_2(1-x_3) + (1-x_4) = 0.5 \quad (16)$$

$$x_1 + (1-x_2) + (1-x_3) + (1-x_4) = 0.5 \quad (17)$$

$$(1-x_1) + x_2 + (1-x_3) + (1-x_4) = 0.5 \quad (18)$$

Among these equations, the plane represented by equation (15) is the main plane, and the remaining planes are the subplanes.

In this example, since the area defined by the method a is surrounded by two planes, the threshold value of the output neuron element is given as 1.5.

ON conditions of the intermediate neuron elements are given as follows according to equations (15), (16), (17), and (18):

$$1.5 - x_1 - x_2 - x_3 - x_4 > 0$$

$$0.5 + x_1 + x_2 - x_3 + x_4 > 0$$

$$-2.5 - x_1 + x_2 + x_3 + x_4 > 0$$

$$-2.5 + X_1 - X_2 + X_3 + X_4 > 0.$$

Figure 8:
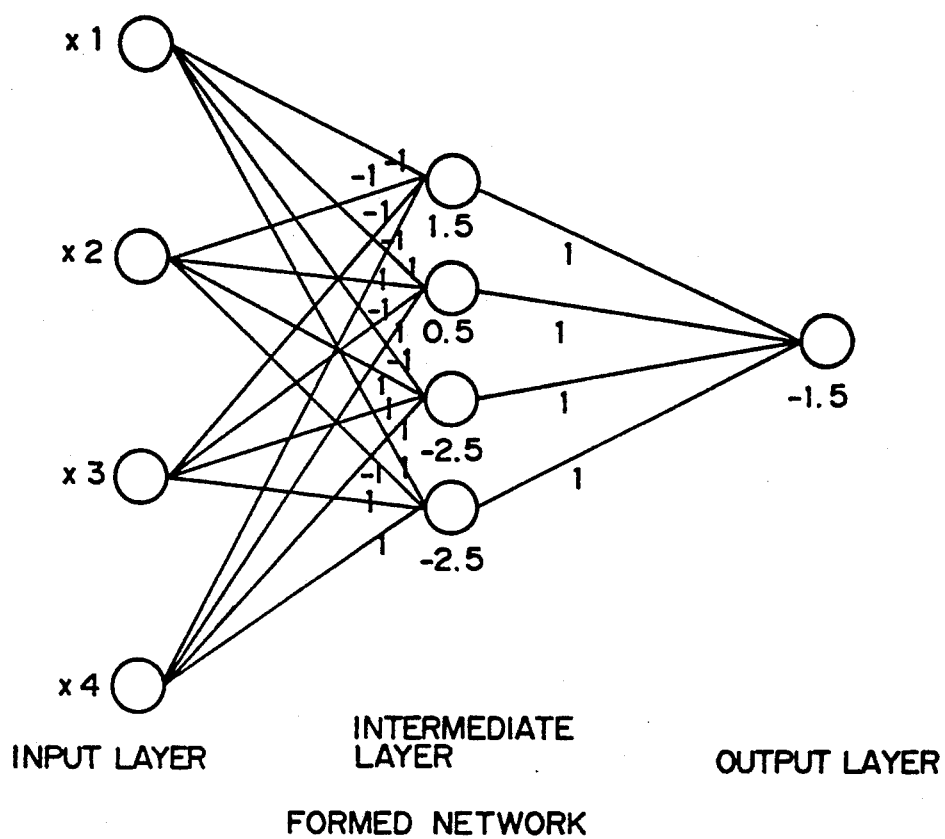
FIG. 8 is a diagram sowing a neural network formed by the learning patterns shown in FIG. 6.

FIG. 8 shows a neural network thus obtained.

Referring to FIG. 8, when the input value is "0", each input neuron element outputs "0". If the input value is "1", each input neuron element outputs "1". When a sum of the input value and the threshold value is 0 or more, each neuron element outputs "1". Otherwise, it outputs "0".

3. Computer Simulation

Simulation of a neural network having 324 (18×18) input neuron elements, 96 intermediate neuron elements, and 26 output neuron elements was performed.

A total of 130 (=26×5) learning patterns (i.e., five patterns for each of letters a to z) were prepared. These learning patterns were read by the image reader 17 as a printed document to determine coupling weights.

Learning by the BP algorithm required several learning hours to determine the coupling weights. However, it took only about a minute to determine coupling weights according to this embodiment.

Figure 9:
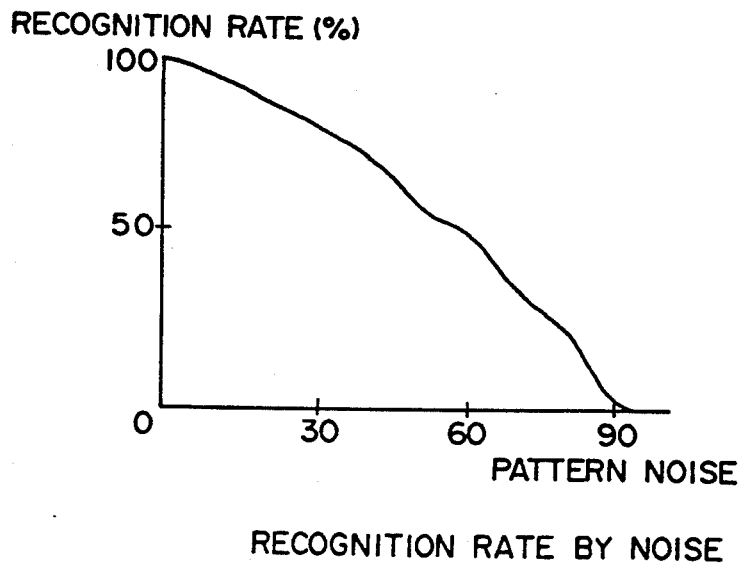
FIG. 9 is a graph showing a relationship between noise of a designated pattern and the recognition rate.

In order to examine a generality of the neural network having the above arrangement, patterns with noise were recognized. A decrease in recognition rate, caused by pattern noise, was very small, as shown in FIG. 9.

When the letters were read by the image reader 17, the read data were developed in a bit map memory (not shown), and the bit map data were divided into 18×18 portions corresponding to the respective input neuron elements. The presence/absence of dot data in each divided portion was determined by a majority decision method and was used as input data to each input neuron element.

As has been described above, according to this embodiment, since coupling weights between the respective input neuron elements in a neural network are directly calculated by computational processing, the learning time can be greatly shortened.

In addition, the coupling weights can be determined without causing local minima trapping as a result of learning.

Since the coupling weights have only two values, i.e., "1" and "−1", network hardware can be easily implemented. Even if a neural network is used in software simulation, coupling weights can be determined by a simple integer calculation, thereby achieving high-speed processing.

According to the present invention, patterns of a specific group can be separated from a plurality of patterns constituting a plurality of groups present in an n-dimensional pattern space in accordance with simple computational processing. The present invention can be used in a variety of applications such as recognition of characters, figures, and the like.

What is claimed is:

1. A method of separating specific patterns from an assumed n-dimensional pattern space, comprising:

the first step of calculating a main plane having a larger number of patterns of a specific group than other patterns among a plurality of patterns constituting a plurality of groups present in the n-dimensional pattern space;

the second step of calculating a subplane for eliminating other patterns from the main plane when the other patterns are included in the main plane calculated in the first step;

the third step of calculating a subplane for separating patterns of the specific group from other patterns and enclosing the patterns of the specific group when the patterns of the specific group are included in a plane other than the main plane calculated in the first step; and the fourth step of separating the specific patterns by the main plane and the subplanes which are respectively calculated in the first, second, and third steps.

2. A method according to claim 1, wherein
the plurality of patterns are a plurality of learning patterns in a hierarchical neural network, and
said method further comprises:
the fifth step of selecting each neuron element of the intermediate layer corresponding to each plane separating the specific patterns used in the fourth step;
the sixth step of determining a threshold value of the neuron element selected in the fifth step and a coupling weight thereof with respect to each neuron element of the input layer in accordance with an equation representing each corresponding plane; and
the seventh step of selecting a neuron element of the output layer coupled to each neuron element selected in correspondence with the specific patterns in the fifth step, and determining a threshold value of the selected neuron element in accordance with the number of planes for separating the specific patterns.

3. An apparatus for separating specific patterns from an assumed n-dimensional pattern space, comprising:
first calculating means for calculating a main plane having a larger number of patterns of a specific group than other patterns among a plurality of patterns constituting a plurality of groups present in the n-dimensional pattern space;
second calculating means for calculating a subplane for eliminating other patterns from the main plane when the other patterns are included in the main plane calculated by said first calculating means;
third calculating means for calculating a subplane for separating patterns of the specific group from other patterns and enclosing the patterns of the specific group when the patterns of the specific group are included in a plane other than the main plane calculated by said first calculating means; and
means for separating the specific patterns by the main plane and the subplanes which are respectively calculated by said first, second, and third calculating means.

4. An apparatus according to claim 3, wherein the plurality of patterns are a plurality of learning patterns in a hierarchical neural network, and
said apparatus further comprises:
intermediate layer neuron element selecting means for selecting each neuron element of the intermediate layer corresponding to each plane separating the specific patterns used by said separating means;
intermediate layer determining means for determining a threshold value of the neuron element selected by said intermediate layer neuron element selecting means and a coupling weight thereof with respect to each neuron element of the input layer in accordance with an equation representing each corresponding plane; and
output layer determining means for selecting a neuron element of the output layer coupled to each neuron element selected in correspondence with the specific patterns in said intermediate layer neuron element selecting means, and determining a threshold value of the selected neuron element in accordance with the number of planes for separating the specific patterns.

* * * * *

UNITED STATES PATENT AND TRADEMARK OFFICE
CERTIFICATE OF CORRECTION

PATENT NO. : 5,259,039
DATED : November 2, 1993
INVENTOR(S) : Norio AKAMATSU

It is certified that error appears in the above-indentified patent and that said Letters Patent is hereby corrected as shown below:

At column 8, line 56 (claim 1, line 7), change ":" to ---;---.

Signed and Sealed this

Sixth Day of May, 1997

*Attest:*

BRUCE LEHMAN

*Attesting Officer*     Commissioner of Patents and Trademarks